(12) United States Patent
Gales et al.

(10) Patent No.: US 6,234,303 B1
(45) Date of Patent: May 22, 2001

(54) CONVEYOR ASSEMBLY

(75) Inventors: Charles C. Gales; Mark A. Killian; Kenneth E. Gundel, all of Lancaster, PA (US)

(73) Assignee: Emtrol, Inc., Lancaster, PA (US)

( * ) Notice: Subject to any disclaimer, the term of this patent is extended or adjusted under 35 U.S.C. 154(b) by 0 days.

(21) Appl. No.: 09/391,640

(22) Filed: Sep. 7, 1999

(51) Int. Cl.[7] .................................................. B65G 15/10
(52) U.S. Cl. ............................................................ 198/817
(58) Field of Search .................................. 198/817, 847, 198/606, 626.1; 414/278, 272, 327

(56) References Cited

U.S. PATENT DOCUMENTS

| | | |
|---|---|---|
| 331,414 | 7/1885 | Barnes . |
| 1,102,232 | 7/1914 | Benedict . |
| 1,942,022 | 1/1934 | Faries ..................................... 180/9.1 |
| 3,283,882 | * 11/1966 | Conrad ................................. 198/817 |
| 3,313,429 | 4/1967 | Cole ....................................... 214/38 |
| 4,273,494 | 6/1981 | Swain et al. .......................... 414/266 |
| 4,286,911 | 9/1981 | Benjamin ............................. 414/273 |
| 4,568,233 | 2/1986 | Baker et al. .......................... 414/267 |
| 4,640,459 | 2/1987 | Hetemaa et al. ..................... 238/122 |
| 4,965,940 | 10/1990 | Wilson ................................ 33/651.1 |
| 4,971,508 | 11/1990 | Miyahara et al. .................... 414/282 |
| 5,009,306 | * 4/1991 | Roderick et al. ................. 198/817 X |
| 5,054,986 | 10/1991 | Hirano et al. ......................... 414/282 |
| 5,170,897 | 12/1992 | Wentworth ............................ 211/181 |
| 5,286,157 | 2/1994 | Vainio et al. ......................... 414/273 |
| 5,370,492 | 12/1994 | Gleyze et al. ........................ 414/279 |
| 5,388,955 | 2/1995 | Schröder .............................. 414/279 |
| 5,445,280 | 8/1995 | Rahn .................................... 211/186 |
| 6,142,293 | * 11/2000 | Ozawa et al. ..................... 198/817 X |

\* cited by examiner

Primary Examiner—James R. Bidwell
(74) Attorney, Agent, or Firm—Barley, Snyder, Senft & Cohen, LLC

(57) ABSTRACT

The invention is directed to a conveyor assembly for use in conveying a load from a first device or member to a second device or member. The conveyor assembly has a frame with a pair of frame support members spaced from each other in an essentially parallel manner. A pair of belts are provided proximate the frame support members, with each belt having a wide portion and a narrow portion. The wide portions of the belts cooperate with surfaces of the frame support members when the belts are in a first position. The wide portions of the belt cooperate with a container such that as the belt is moved from the first position to the second position, the container is moved accordingly. The narrow portion allows a transport assembly to be moved into and out of the conveyor assembly, whereby the configuration of the belt allows the conveyor assembly to be used for containers which are more narrow than the transport assembly, thereby effectively providing the transport assembly with an effectively smaller width.

14 Claims, 8 Drawing Sheets

CONVEYOR ASSEMBLY

FIELD OF THE INVENTION

The invention relates to an assembly, which is utilized to transfer a load from a first device to a second device. In particular, the invention is directed to a conveyor assembly configured to accept more narrow loads than could previously be accommodated.

BACKGROUND OF THE INVENTION

As companies are continually required to reduce price in order to stay competitive, costs of production must be driven down. It is not sufficient to merely analyze material costs, all costs including production-handling costs and storage costs must be made cost effective.

One method to eliminate costs and improve efficiency is to utilize automated storage and retrieval systems, both during production and in warehousing. One such system is disclosed in a brochure entitled "Take Control with Emtrol—Automated Pan and Trough Storage—Retrieval Systems". While this system is shown for use in the baking industry, the concepts can be utilized in any industry in which inventory must be stored and retrieved. These systems allow for immediate personnel reductions, greater effective floor capacity and increased production.

It is important to note that loads handled by the automated systems are not specifically designed to make the system operate more effectively. Rather the loads have generally been designed to function with the production equipment to produce the finished goods or for optimum performance of the material. For instance, in the baking industry, the loads consist of baking pans or containers. The pans have been dimensioned to work with the baking or processing equipment and to allow optimum use of the dough. The dimensions of the pans are not and cannot be governed by the retrieval system. Consequently, the retrieval system must be designed around the optimal configuration of the pans.

To date containers of all sizes required in the industry have been accommodated. However, due to the limitations of components of the system, some of the more narrow containers have occupied more space than necessary, resulting in a less than optimum use of the overall space required for the system. One such practical limitation of the system occurs due to the physical requirements for the transport vehicle. These transport vehicles, as exemplified in the U.S. patent application Ser. No. 08/978,835 filed Nov. 26, 1997, are constructed to provide heavy lifting capacity in a simple and compact lift. As the weight of the load increases, the internal cams, gearboxes and motors of the transport vehicle must increase in order to handle the loads effectively. If the overall dimensions of the transport vehicle increase beyond the dimensions required to support the smallest load, the transport vehicle rather than the load is what governs the grid spacing. This is not a desired result as it causes the overall system cost to increase.

Although the actual size of the transport vehicle can only be reduced so far without effecting the power and physical stability thereof, it would be beneficial if parts of the remainder of the system could be modified to give the transport vehicle an effectively smaller width.

SUMMARY OF THE INVENTION

The invention is directed to a conveyor assembly for use in conveying a load from a first device to a second device. The conveyor assembly has a frame with a pair of frame support members spaced from each other in an essentially parallel manner. A pair of belts are provided proximate the frame support members, with each belt having at least one wide portion and at least one narrow portion. The wide portions of the belts cooperate with surfaces of the frame support members when the belts are in a first position. In operation, the load is positioned on the wide portions of the belts so that as the belts are moved from the first position to a second position, the load is moved to the second device. Circular members are provided at the ends of the frame support members and cooperate with the belts, such that as the belts are moved between the first and second positions, the circular members are moved accordingly.

The wide portions of the belt cooperate with a container such that as the belt is moved from the first position to the second position, the container is moved accordingly. The narrow portion allows a transport assembly to be moved into and out of the conveyor assembly, whereby the configuration of the belt allows the conveyor assembly to be used for containers which are more narrow than the transport assembly, thereby effectively providing the transport assembly with an effectively smaller width.

BRIEF DESCRIPTION OF THE DRAWINGS

The invention will now be described by way of example with reference to the accompanying drawings in which.

DETAILED DESCRIPTION

Figure 1:
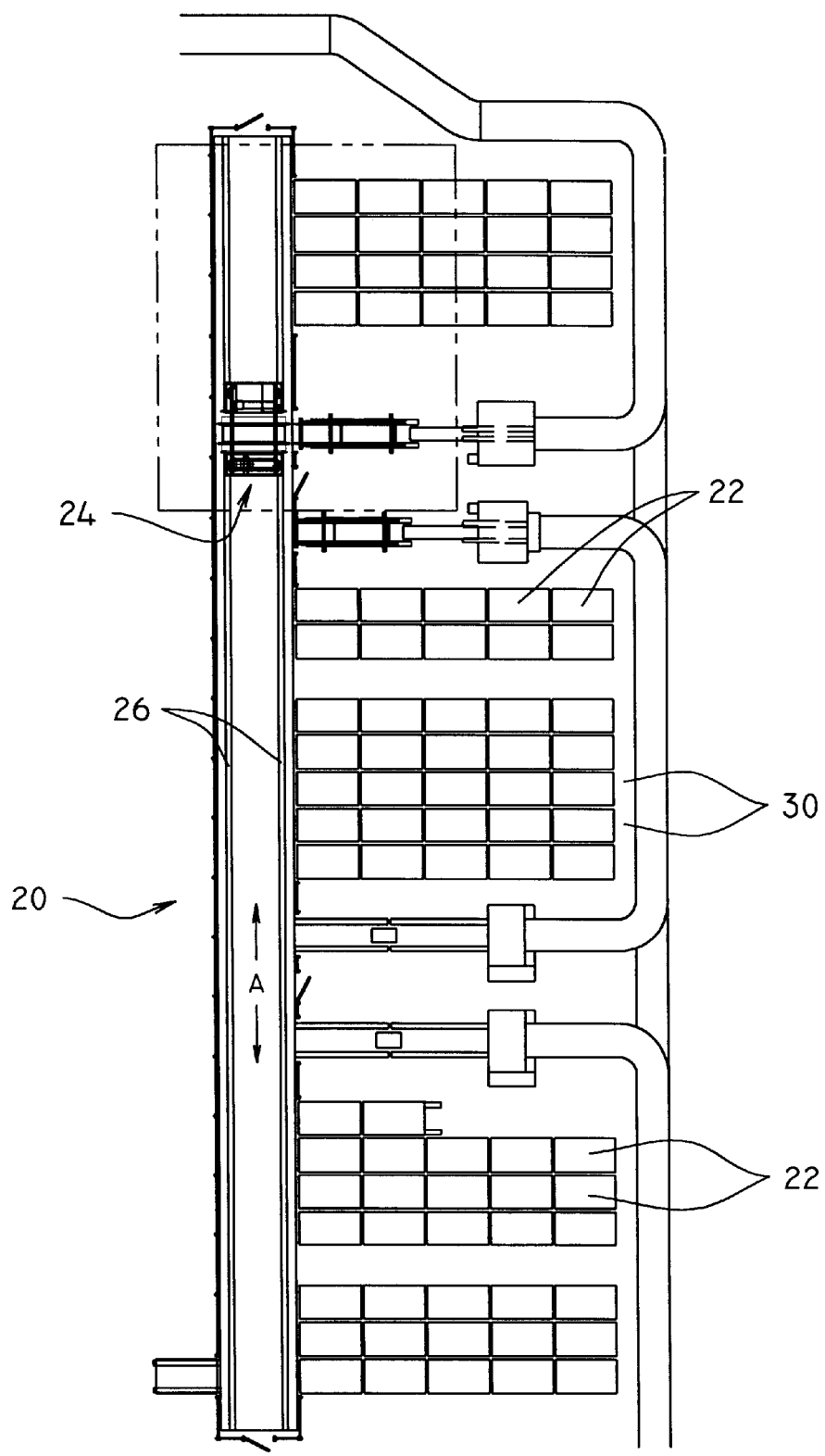
FIG. 1 is a plan view of a storage retrieval system showing the general layout.

FIG. 1 illustrates the overall layout of a container storage and retrieval system 20. The system is used to store containers 22. The length of time and purpose of the storage varies depending upon the process being performed and the material involved. In this particular instance, several types of containers are maintained in a "stored" position while others types are used in production.

Figure 2:
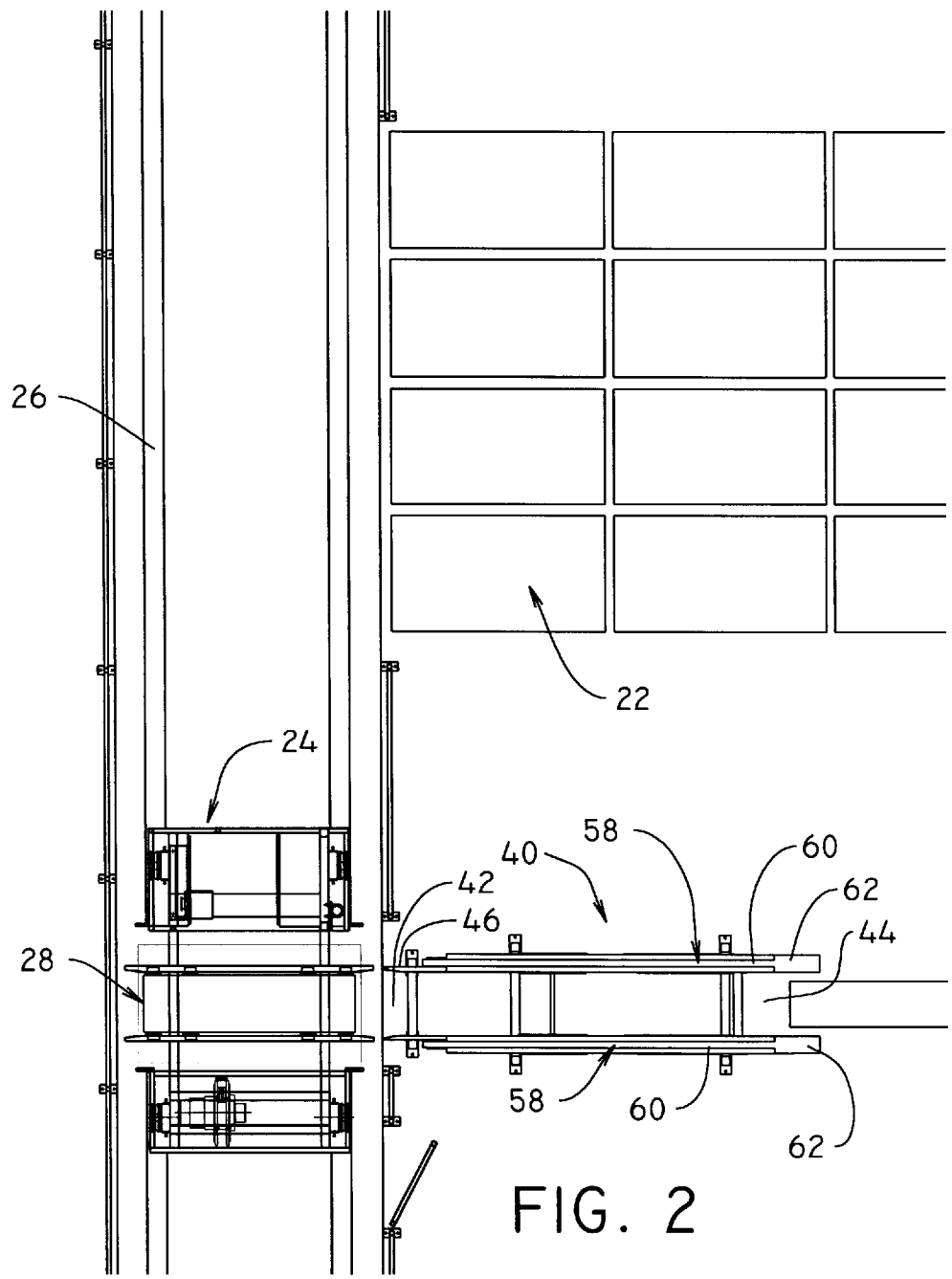
FIG. 2 is an enlarged view of a portion of the storage retrieval system shown in the areas outlined by the dotted line in FIG. 1.

The system 20 has a shuttle 24 that moves along track 26 in the direction indicated by arrow A shown in FIG. 1. The shuttle is configured to accommodate a transport vehicle 28 therein, as shown in FIG. 2. As the shuttle 24 is moved, the transport vehicle 28 is housed completely on shuttle 24 thereby allowing the transport vehicle 28 to move with shuttle 24.

Container storage aisles 30 are provided proximate track 26. Aisles 30 have tracks that cooperate with wheels of the transport vehicle 28. The longitudinal axis of the tracks 26 for the shuttle are essentially perpendicular to the longitudinal axis of the tracks for aisles 30, thereby allowing the transport vehicle to move from the shuttle into the tracks of a respective aisle 30 to pick up or deposit a container 22. For a more detailed description of the overall operation of the transport vehicle 28, refer to U.S. patent application Ser. No. 08/978,855 filed Nov. 26, 1997, which is hereby incorporated by reference.

In the container storage and retrieval system illustrated in the drawings, the container 22 (or group of containers) is maintained in storage for a length of time At the appropriate time, the transport vehicle 28 recovers the container, and in conjunction with the shuttle 24 moves the container to conveyor assembly 40. It should be noted that various shapes and sizes of containers are manipulated through the storage and retrieval system. Consequently, for the system to be completely automated, the transport vehicle 28 must be designed to move and lift the largest container as well as the smallest container.

Figure 3:
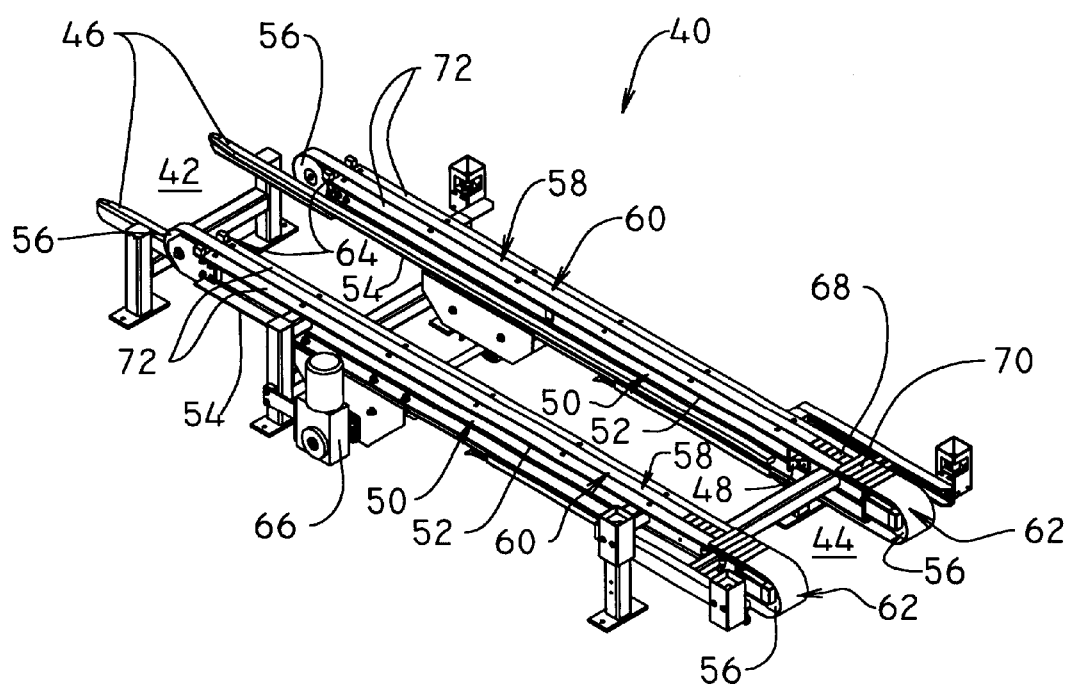
FIG. 3 is a perspective view showing the conveyor assembly of the present invention.

Conveyor assembly 40 has a first end or transport vehicle entrance end 42 and a second end or load conveyance end 44. A pair of rails 46 extends from the first end 42 toward the second end 44. Proximate rails 46 near the second end 44 are transport vehicles stops 48, as shown in FIG. 3. Rails 46 and transport vehicle stops 48 extend from and are integral with respective side frame members 50. The longitudinal axis of the frame members are essentially parallel to each other. Each side frame member 50 has a bottom surface 54 and a top surface 52 which has a wear strip 72 attached thereto. At either end of each frame member 50 are attached circular members or wheels 56. The wheels 56 are mounted on the frame members in a manner, which allows each wheel to rotate about its center. On each frame member, a belt or chain 58 extends between circular members 56. Each belt 58 has a narrow section 60 and a wide section 62. The narrow section and wide section combine to form a continuous belt. As best shown in FIG. 3, the particular belt 58 illustrated in the figures is made from narrow metal links 68 and wide metal links 70. However, the belt may be made from plastic, rubber, or other substances depending on load, environmental and/or industry requirements. These belts may be produced utilizing links or by molding, cutting or other known operations. A pair of lugs or container load stops 64 are provided on the top surface 52 of each side frame 50, as will be more fully discussed below.

A motor 66 is attached to a respective side frame member. The motor shown is electric but can be powered by other means depending on the environment in which it is used and the load that must be moved.

Figure 4:
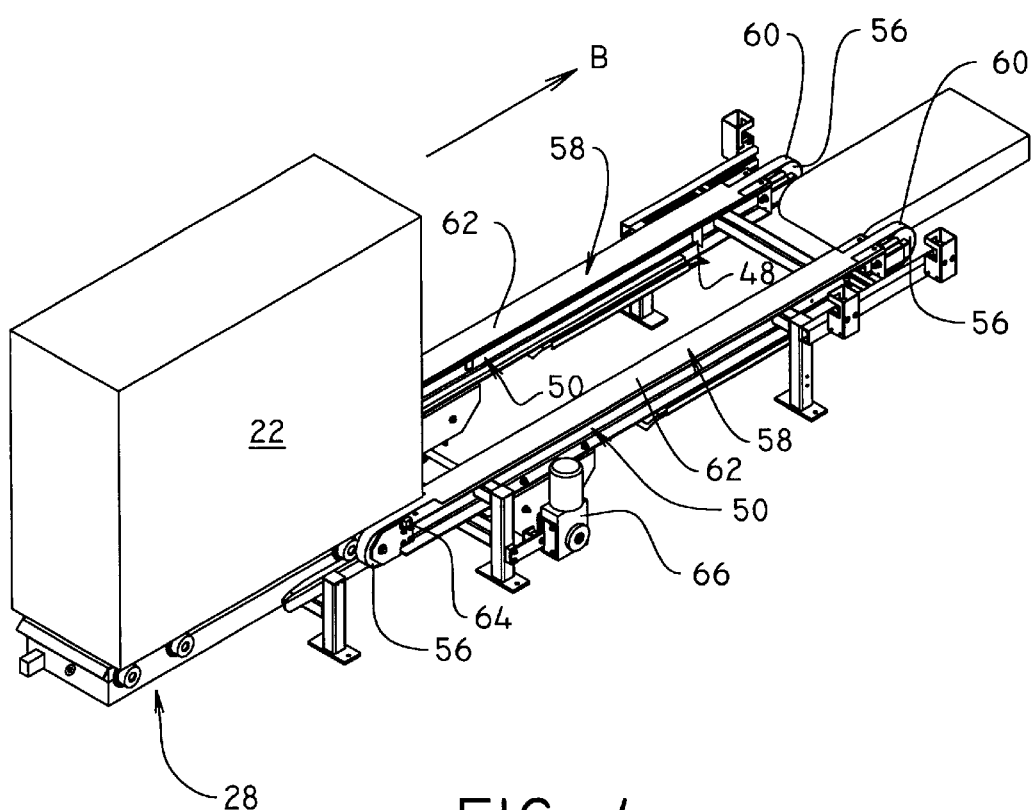
FIG. 4 is a perspective view of the conveyor assembly with a container or load being moved onto the assembly and the belts positioned in the first position.

Referring to FIG. 4, the container 22 and transport vehicle 28 are moved, in the direction indicated by arrow B, into cooperation with conveyor assembly 40. As the transport vehicle and container are moved, the transport vehicle passes through the transport vehicle entrance end 42 of the conveyor assembly 40, causing the wheels 32 of the transport vehicle 28 to be positioned proximate circular members 56 and side frame members 50 of the conveyor assembly 40. In fact, referring to FIG. 8, the distance X that the portion of the side frame members 50 adjacent wheels 56 must be spaced apart is governed by the distance Y provided between the outside surface of opposed wheels 32 of the transport vehicle 28. In other words, distance X must be slightly greater than distance Y in order to allow the transport vehicle 28 to move into and out of the conveyor assembly 40.

Figure 9:
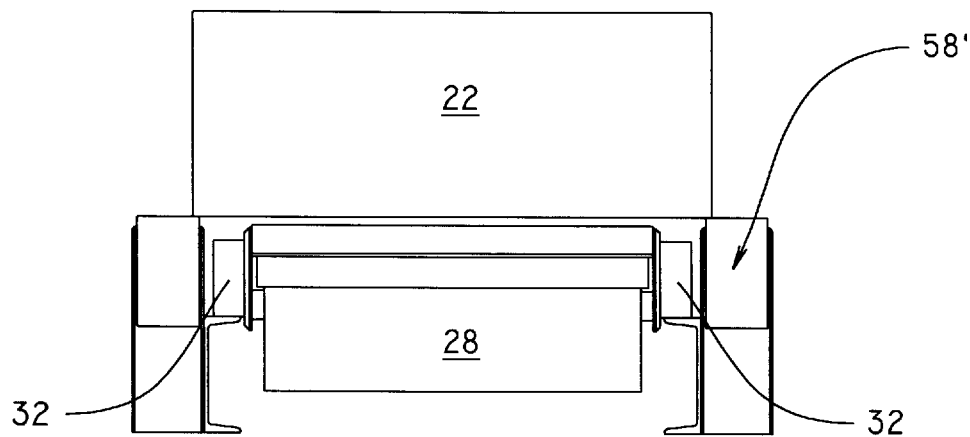
FIG. 9 is a front elevation view of the prior art showing the position of the wheels of the transport vehicle in relation to the prior art belts when the belts are in the first position.

As viewed in FIG. 9, which shows the prior art, chain 58' is a continuous chain or belt which has a constant width when viewed in cross section. As the belt is continuous and has a constant width, the entire belt must be spaced from its counterpart belt by a distance more than Y. If the belts were spaced closer than Y, the wheels 32 of the transport vehicle 28 could not pass beyond the belts 58' and consequently, the transport vehicle 28 could not be moved into cooperation with the conveyor assembly 40'. Therefore, the distance Y between outside surfaces of the wheels 32 effectively governs the spacing of the side frame members and the belt 58'. In practical terms, the width of the container 22 can not be less than X, as a container with a width less than X will not engage both belts 58'. In fact, as illustrated in FIG. 9, the container must have a width which is greater than X in order to allow for sufficient cooperation between the container and the belts to insure error free operation.

Figure 8:
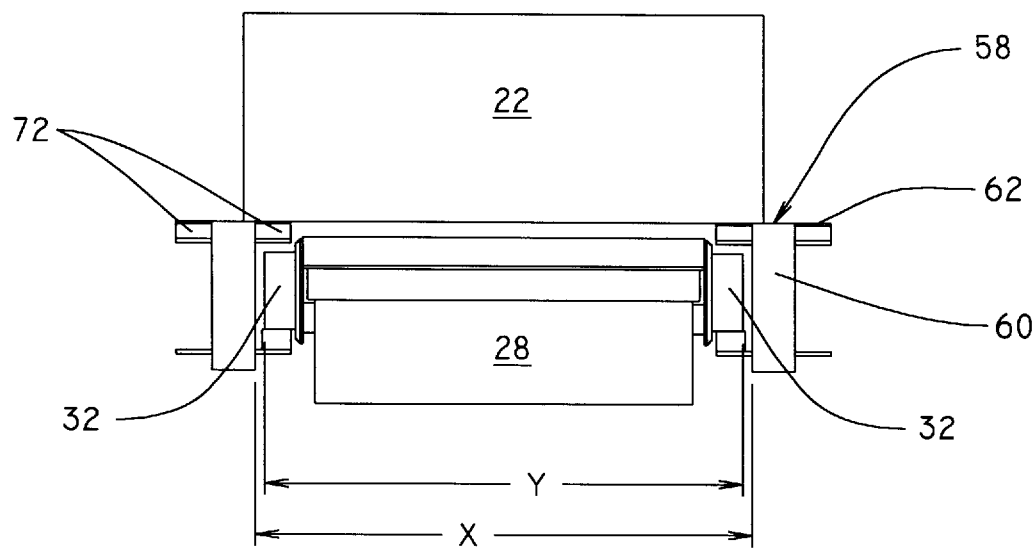
FIG. 8 is a front elevation view showing the position of the wheels of the transport vehicle in relation to the belts when the belts are in the first position.

While the prior art conveyor and chain works well for many applications, it is becoming increasingly important to minimize the area of the container, thereby allowing less floor space to be occupied by the container storage and retrieval system. In order to accomplish this, FIG. 8 illustrates the current invention. As is readily seen, the invention allows the chains 58 to effectively be closer together, allowing the portions of the belts to be spaced apart a distance less than Y. This in turn allows the conveyor assembly 40 to accommodate a container with a smaller width than could previously be accommodated. As each container can be smaller, occupying less space, more containers can be stored in the same floor space. In many applications, the storage and retrieval system must accommodate containers of varying size. The use of the chains 58 allows the containers to be designed for optimum use for the load, eliminating the need to maintain an arbitrary minimum width required by the physical dimensions of the transport vehicle.

Referring to FIG. 4, conveyor assembly 40 is shown in its initial or first position, in which it is positioned to receive the transport vehicle 28 and the container 22. The chains 58 are positioned such that the wide sections 62 are proximate the rails 46 and in proximity to the wear strips 72 provided on side members 50. In the embodiment shown, when the belts are in this first position, the wide sections 62 do not engage the circular members 56, the narrow sections 60 cooperate with the circular members 56. With the chain 58 in this initial position, the wheels 32 of the transport vehicle 28 can enter in the first end 42 of the conveyor assembly 40 without engaging chains 58, thereby allowing the transport vehicle 28 and container 22 to move to the position shown in FIG. 5.

The chain or belt used can be configured in many different ways. The fact that the narrow links 68 extend more than half way around the perimeter of the chain provides some advantage, as will be discussed. However, the only requirement is that the narrow links 68 engage the wheels 32 at the transport vehicle entrance 42 when the transport vehicle 28 is moved into and away from the conveyor assembly 40.

Figure 5:
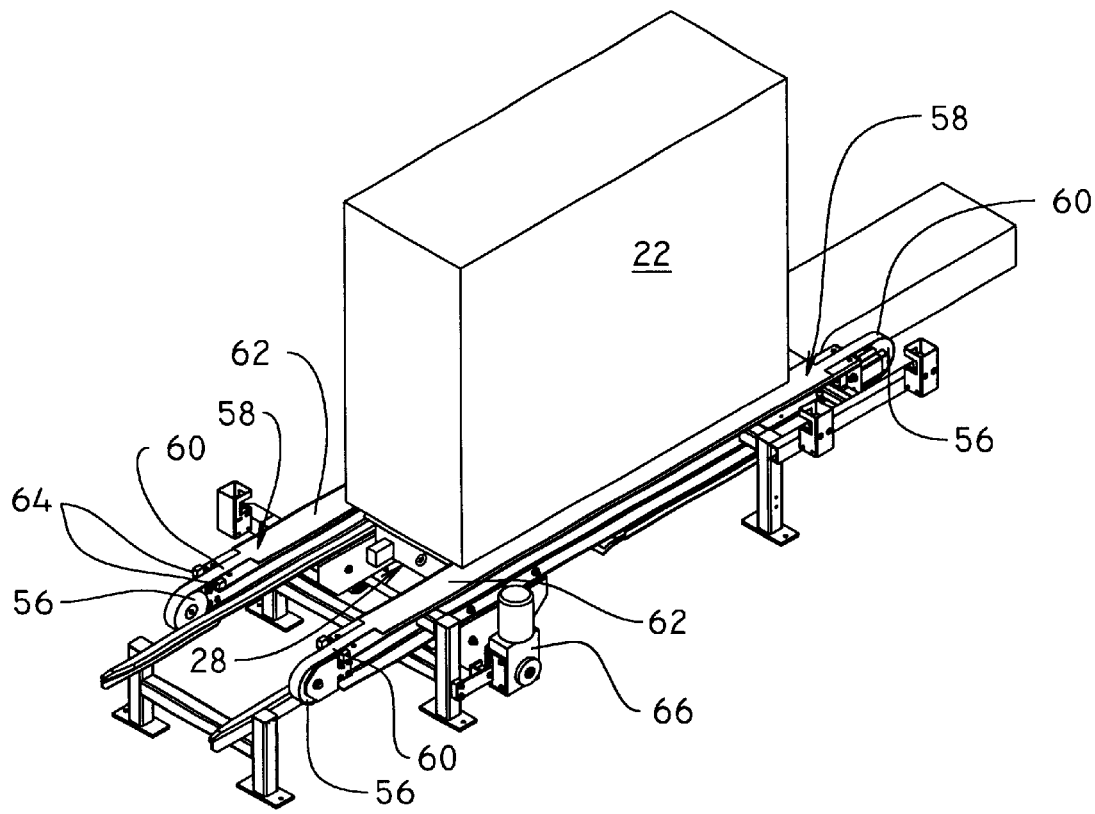
FIG. 5 is a perspective view of the conveyor assembly showing the container positioned on the conveyor assembly and the transport vehicle positioned below the container.

As the transport vehicle 28 moves from the position shown in FIG. 4 to the position shown in FIG. 5, the transport vehicle stops 48 prevent the over travel of the transport vehicle 28. With the transport vehicle 28 properly positioned, the transport vehicle lowers the container 22, placing the bottom of the container in contact with the wide section 62 of the chain 58. The top portion of the transport vehicle 28 continues to be lowered away from container 22 until the vehicle and container are no longer in contact with each other. The container 22 rests entirely on wide sections 62 of chains 58. The chains 58 rest upon wear surfaces 72 for extra support. Container load stops 64 are positioned to insure that the container cannot be inadvertently moved back toward the transport vehicle entrance 42. The stops 64 will engage the container 22 to prevent this movement when the container is positioned on the chain.

Figure 6:
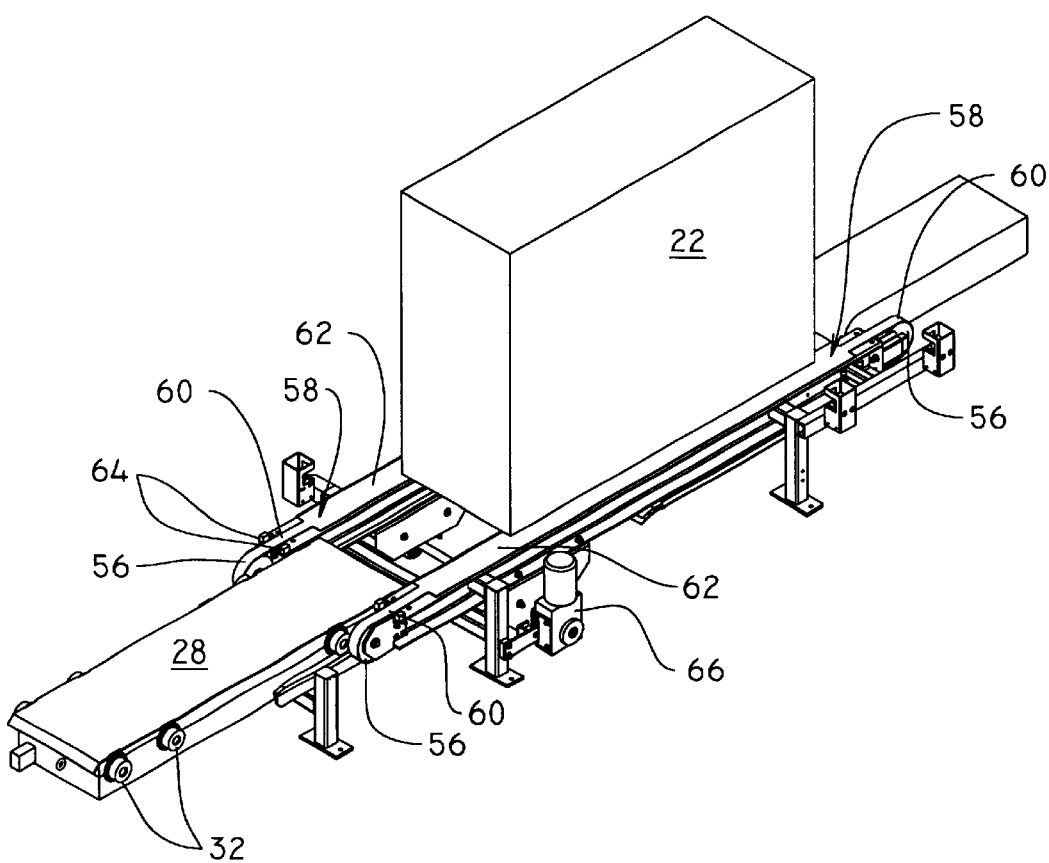
FIG. 6 is a perspective view of the conveyor assembly showing the container positioned on the conveyor assembly and the transport vehicle being removed therefrom.
Figure 7:
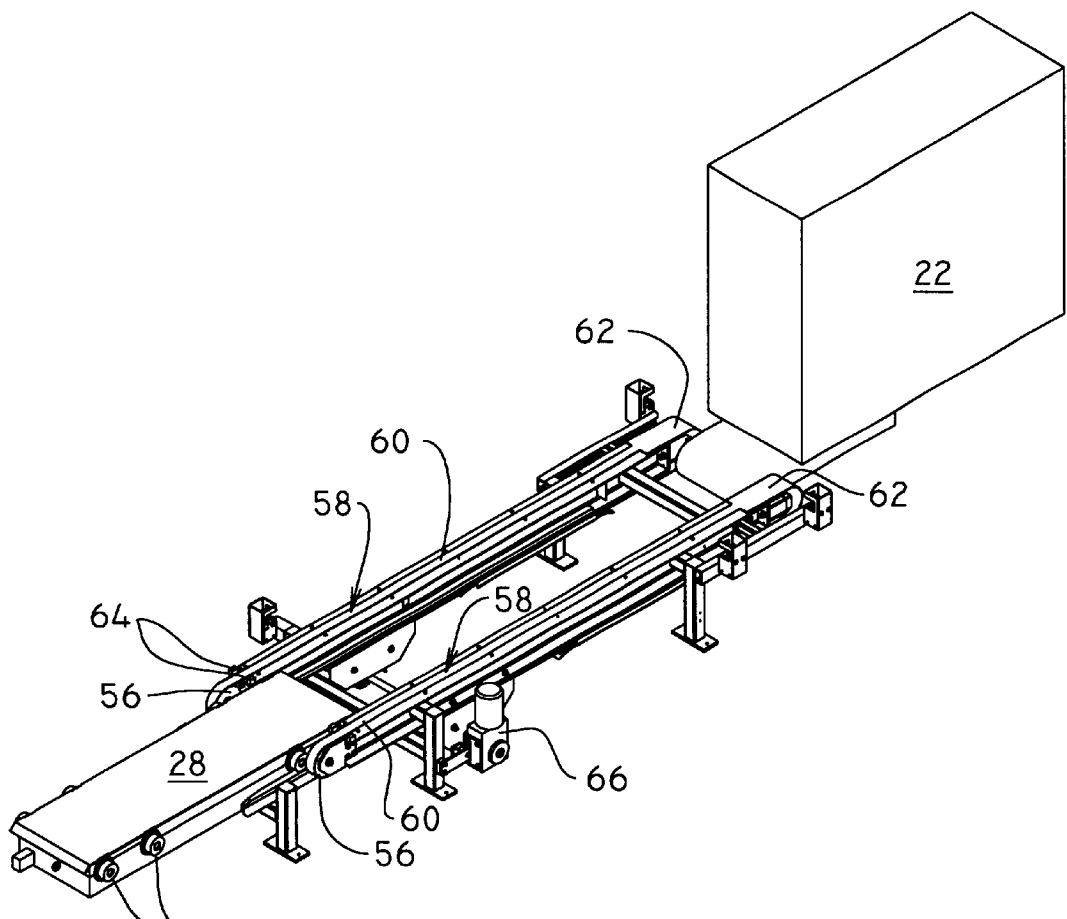
FIG. 7 is a perspective view of the conveyor assembly showing the container or load moved from the conveyor assembly and the belts positioned in the second position.

With the container 22 supported by the wide sections 62 of chains 58, the transport vehicle 28 is backed out, as shown in FIG. 6. Either after the vehicle is backed out or as the vehicle is being backed out, the motor 66 is started, causing the chains 58 to move around circular members 56, toward the second position. This movement of the chain causes the container to be moved to the next station, as shown in FIG. 7. If a sufficient number of narrow links 68 are provided to allow the narrow section 60 to be of sufficient length, the transport vehicle 28 and chain 58 can be moved at the same time, thereby eliminating needless idle time for the transport vehicle. In order to accomplish this, the length of the narrow section 60 must be sufficient to allow the narrow section to remain in engagement with the wheels 32 at the transport vehicle entrance 42 as the chain is moved between the first and second positions. In the second position, the wide sections 62 of the chains are moved into engagement with respective wheels 56 positioned at the load conveyance end 44. As the wide sections do not engage the wheels at the transport vehicle entrance 42, the transport vehicle is able to move into and out of the conveyor assembly even when the chain is in the second position. Once the container has been moved past the load conveyance end 44, the motor 66 is reversed and the chain 58 is returned to the position indicated in FIG. 4. With the chain returned to the first position, the chains and conveyor assembly are positioned to repeat the process.

By providing the chain with a wide portion and a narrow portion, smaller containers can be accommodated. As space requirements in many manufacturing, storage and/or warehouse facilities are always of primary concern; the use of the invention provides a significant advantage.

It is worth noting that as the transport vehicle must be designed to accommodate containers of varying size (the stability of the transport vehicle must be maintained and the equipment housed in the vehicle cannot be eliminated), the width of the vehicle cannot be reduced. Consequently, the invention described herein allows smaller containers to be accommodated without effecting the reliability of the storage and retrieval system.

While the figures show a container being moved from a transport vehicle to a next station, the invention is equally applicable when moving a container from a station to a transport vehicle. Other changes in construction will occur to those skilled in the art and various apparently different modifications and embodiments may be made without departing from the scope of the invention. The matter set forth in the foregoing description and the accompanying drawings is offered by way of illustration only. It is, therefore, intended that the foregoing description be regarded as illustrative rather than limiting. The following claims should, therefore, be interpreted to include all equivalent embodiments within the spirit and scope thereof.

What is claimed is:

1. A continuous belt for use in a conveyor assembly, the continuous belt being movable from a first position to a second position, the continuous belt comprising:

a wide portion which cooperates with a container such that as the belt is moved from the first position to the second position, the container is moved accordingly, a narrow portion which allows a transport assembly to be moved into and out of the conveyor assembly, whereby the configuration of the belt allows the conveyor assembly to be used for containers which are more narrow than the transport assembly.

2. A continuous belt as recited in claim 1 wherein the belt is made of rubber.

3. A continuous belt as recited in claim 1 wherein the belt is made of metal links which are joined together, the metal links of the wide portion being larger than the metal links of the narrow portion.

4. A continuous belt as recited in claim 1 wherein the narrow portion extends a distance which is over half of the distance of the perimeter of the belt.

5. A conveyor assembly for use in conveying a load from a first member to a second member, the conveyor assembly comprising;

a frame with a pair of frame support members spaced from each other in an essentially parallel manner, a pair of belts provided proximate the frame support members, each belt having a wide portion and a narrow portion, the wide portions of the belts cooperate with surfaces of the frame support members when the belts are in a first position, whereby the load is positioned on the wide portions of the belts so that as the belts are moved from the first position to a second position, the load is moved to the second member.

6. A conveyor assembly as recited in claim 5 wherein circular members are provided at the ends of the frame support members, the circular members cooperate with the belts, such that as the belts are moved between the first and second positions, the circular members are moved accordingly.

7. A conveyor assembly as recited in claim 6 wherein the belt is made of metal links which are joined together, the metal links of the wide portion being larger than the metal links of the narrow portion.

8. A conveyor assembly as recited in claim 6 wherein the narrow portion extends a distance which is over half of the distance of the perimeter of the belt.

9. A conveyor assembly as recited in claim 6 wherein the belt is made of rubber.

10. A conveyor assembly used to move a load from a first location to a second location, the conveyor assembly comprising;

at least two frame members spaced from each other, the longitudinal axis of the frame members being essentially parallel with each other, circular members provided proximate the ends of the frame members, the circular members mounted on the frame members in a manner so as to permit the rotation of the circular members relative to the frame members, belts provided proximate the frame members, the belts engage and cooperate with the circular members, the belts being movable between a first position and a second position, each belt having a wide portion and a narrow portion, the narrow portions are provided in engagement with the circular members when the belts are in the first position, a motor which causes the belts to be moved between the first position and the second position, whereby the belts cooperate with the load such that as the belts are moved from the first position to the second position, the load is moved from the first location to the second location.

11. A conveyor assembly as recited in claim 10 wherein the wide portions of the belts engage the circular members provided a load conveyance end of the conveyor assembly when the belts are in the second position.

12. A conveyor assembly as recited in claim 10 wherein the belt is made of metal links which are joined together, the metal links of the wide portion being larger than the metal links of the narrow portion.

13. A conveyor assembly as recited in claim 10 wherein the narrow portion extends a distance which is over half of the distance of the perimeter of the belt.

14. A conveyor assembly as recited in claim 10 wherein the belt is made of rubber.

* * * * *